UNITED STATES PATENT OFFICE.

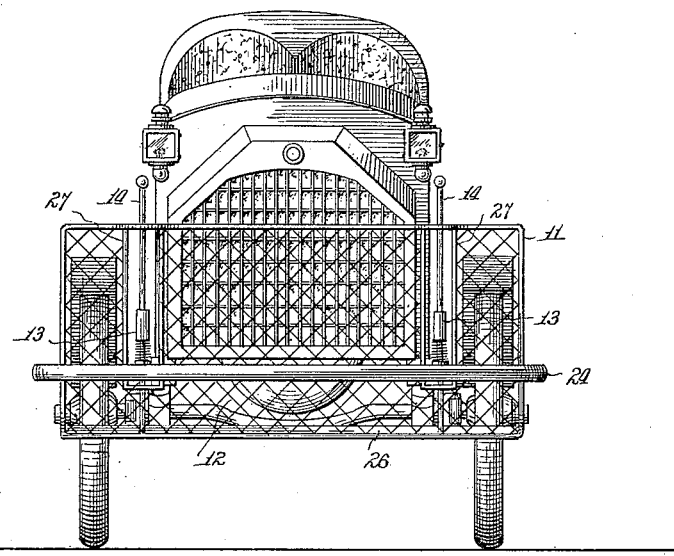
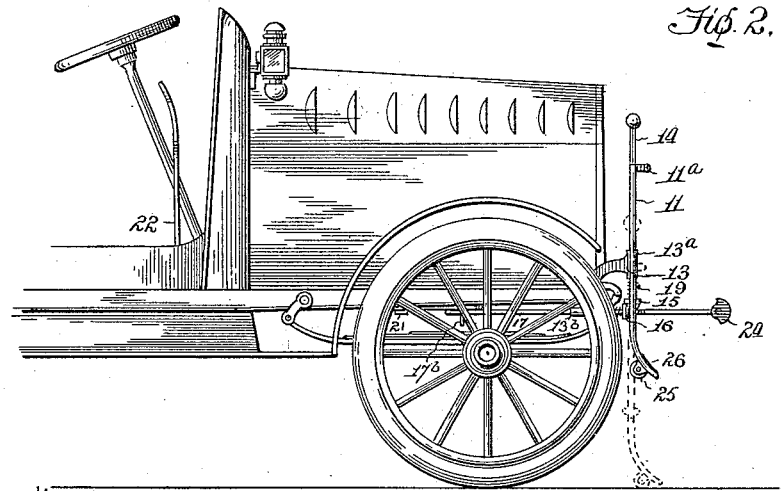

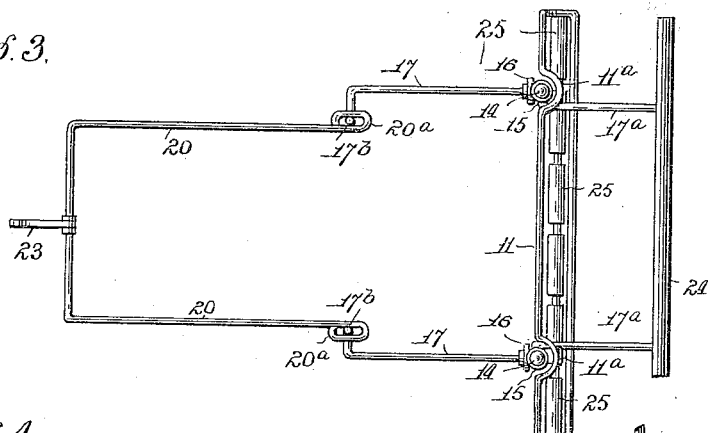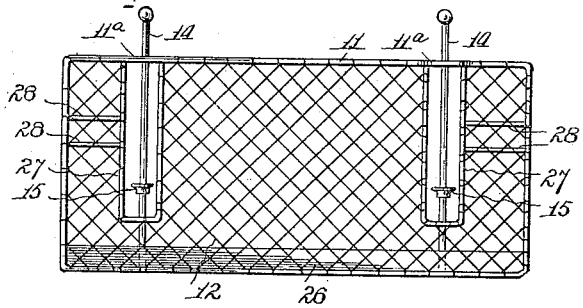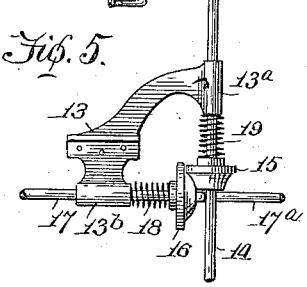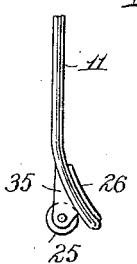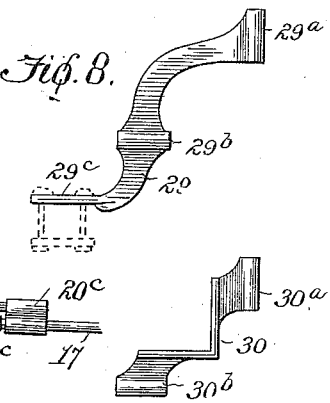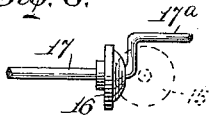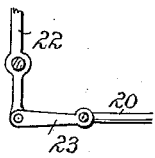

JOHN W. SAUNDERS AND OTTO K. FÖRSTER, OF BALTIMORE, MARYLAND.

FENDER FOR MOTOR-VEHICLES.

1,144,869.  Specification of Letters Patent.  Patented June 29, 1915.

Application filed October 22, 1914. Serial No. 868,093.

*To all whom it may concern:*

Be it known that we, JOHN W. SAUNDERS and OTTO K. FÖRSTER, citizens of the United States, residing in the city of Baltimore, State of Maryland, have invented a Fender for Motor-Vehicles, of which the following is a specification.

The primary object of our invention is to provide a fender of light and simple construction, for application to automobiles and other vehicles, and positioned normally at an elevation above the ground so as not to interfere with the usual running of the vehicle, in connection with devices operating to release the fender and permit it to drop for protection against running over any one who may be in the path of the vehicle and thereby act to prevent accidents to such person or persons.

A further object of our invention is to provide a fender of this character with devices of peculiar construction for supporting the fender in elevated position, and including a forward bar arranged to be struck for operating the fender automatically.

Other objects and advantages of the invention will hereinafter more fully appear, and what we particularly claim as our invention, and desire to protect by Letters-Patent, is more specifically set forth in the appended claims.

In the accompanying drawings, which form a part of this specification: Figure 1 is a front elevation, showing the application of our invention to an automobile. Fig. 2 is a side elevation of the forward part of an automobile, showing the fender applied, the dotted lines showing the fender in dropped position. Fig. 3 is a detail plan view of the fender and means for supporting and releasing the same, the netting being removed from the fender-frame to more clearly show the rollers. Fig. 4 is a detail front elevation of the fender. Fig. 5 is an enlarged detail side elevation, illustrating the means for supporting the fender in elevated position. Fig. 6 is a detail view of one of the supporting collars and rod carrying the same. Fig. 7 is an enlarged detail view on the lower end of the fender. Figs. 8 and 9 are views showing modified forms of supporting brackets, and hereinafter referred to. Fig. 10 is a detail view showing the connection of the operating-lever with the devices for releasing the fender. Fig. 11 is a modification, hereinafter referred to.

Like numerals of reference indicate like parts in all the figures of the drawings.

In carrying out our invention the fender is made up of a wire frame 11, preferably rectangular in shape, covered with netting 12 in the usual manner, and provided in the present instance with vertical rods 14 by which the fender is supported in connection with the vehicle, as hereinafter described.

In use the fender is disposed vertically in front of the automobile, being slidably mounted in brackets 13 fastened to a part of said automobile, whereby said fender may be supported in raised position—out of the way—or in dropped position to rest directly upon the ground for protection. For this purpose the rods 14 extend upward through bearing-sleeves $13^a$ at the outer ends of said brackets, and to hold the fender in raised position said rods are provided with conical collars 15, engaged by similar collars 16 on horizontal rods 17 slidably mounted in bearing-sleeves $13^b$ on the aforesaid brackets 13, accidental disengagement of the collars being prevented by helical springs 18, interposed between the collars 16 and bearing-sleeves $13^b$. The fender will, of course, drop by gravity when the collars 16 are disengaged from the collars 15, but in order to effect a quicker drop, expansion springs 19 are interposed between the collars 15 and bearing-sleeves $13^a$ above the same.

The releasing rods 17 may be operated manually by the driver of the automobile, or automatically when the automobile runs into anything. To accomplish the operation manually, said rods are extended rearward and connected to a sliding wire bail 20, supported in brackets 21 under the forward part of the body of the automobile and operated by a lever 22, the latter being connected by a link 23 (Fig. 10), to said bail, whereby when the lever is pushed forward, it will pull upon the bail and rods connected thereto, thus moving the collars 16 out of engagement with the collars 15, permitting the fender to drop. A similar operation is accomplished automatically by extending the releasing-rods 17 in front of the fender, as at $17^a$, and providing the same with a transverse fender-bar 24, located a suitable distance above the ground so that it will be struck by any one who may be in the way of the automobile. Of course we may employ either a hand-lever, as shown in the drawings, or a foot-lever, in either instance the lever being located at a convenient place for operation from the driver's seat.

The engaging surfaces of the supporting collars 15 and 16 are concave and convex, respectively, (see Fig. 5), and in order that the forward extensions of the releasing-rods may not interfere with the operation of the collars 15, said extensions are bent abruptly, or offset, to one side, as shown in Fig. 6, the offset also serving to form a seat for the lower end of the collar 15, to assist the collars 16 in supporting the fender in raised position.

The connection between the operating bail 20 and fender releasing rods 17 is illustrated in Fig. 3, wherein the ends of the bail are shown as formed into elongated eyes 20$^a$ engaging the bent inner ends 17$^a$ of said releasing-rods, this connection being particularly desirable when the fender and releasing rods are supported from the axle and the bail is supported by the body of the automobile, whereby the elongated eyes will take up for any independent movement of the body.

The lower part of the fender is preferably curved forward in the form of a scoop, and in order that it may run easily over the ground when lowered, the lower end of the frame is provided with rollers 25 on an axle supported in bearing-ears 35 attached to the side bars thereof, the netting being protected from becoming entangled in the rollers by a plate or shield 26.

We do not extend the netting across that part of the fender-frame where are located the rods 14, collars 15, springs 19, and bearing-sleeves 13$^a$, inasmuch as it would be likely to become entangled with these parts; and therefore open spaces are left by providing wire loops 27, connected to and depending from the upper bar of the fender-frame, and braced at their lower ends by the rods 14 which are connected thereto and to the lower bar of said fender-frame. In the present instance, also, the upper bar of the fender-frame is bent outward slightly between the ends of the loops, as at 11$^a$, so as to clear the bearing-sleeve 13$^a$ and avoid contact with the front portion thereof when the fender is lowered and pressure brought against the same. In order to further brace the fender when in lowered position and pressure is brought against the same, a pair of rods 28, 28, are located at each side of the fender-frame between the loops 27 and side bars, said rods being spaced apart a slight distance and so located as to contact with the front wheels of the automobile.

The operation of the fender will be readily understood from the foregoing description, in connection with the accompanying drawings; for should any one be in the way of the approaching automobile, it is only necessary for the driver to operate the lever 22, thus permitting the fender to quickly drop by moving the collars 16 out of engagement with the collars 15, and if the automobile is not stopped before striking the person, the fender will prevent the wheels of the automobile from running over such person. On the other hand, if the driver for any reason does not see a person who may be in the way of the approaching automobile, the fender will be operated or dropped automatically when the fender-bar 24 strikes the person. To reset the fender, it is only necessary to press against the fender-bar 24 to move the collars 16 back and then raise the fender until the collars 15 are above said collars 16, the releasing of the parts now permitting the engagement of the collars to support the fender in elevated position.

It will be understood of course that although we have shown our invention as applied to an automobile it could be easily and conveniently applied to other motor vehicles and to street-railroad cars; also that the fender and releasing rods may be supported from either the body of the vehicle or from the axle, and we have therefore shown different forms of brackets; for instance the bracket 13, shown in Fig. 5, being adapted for attachment to the supporting side rails of the body of an automobile; the bracket 29 (Fig. 8), having the vertical bearing-sleeve 29$^a$, horizontal bearing-sleeve 29$^b$ and plate 29$^c$ being adapted to support the parts from the axle of a vehicle, and the bracket 30, (Fig. 9) being in the form of an angle-bracket, with the bearing-sleeves 30$^a$ and 30$^b$.

In Fig. 11 we have shown a modification of the connection between the operating rods 17 and bail 20; and in this instance, instead of providing the elongated eye 20$^a$ and engaging bent end 17$^b$, we provide one of the parts, as 20, with a sleeve, 20$^c$, sliding upon the inner end of the other part, or operating-rod 17, and engaging a stop 17$^c$ at the end thereof to operate said rod. This form of connection is used when the bracket 13 is attached to the body of the vehicle; while the connection shown in Fig. 3 may be used when the bracket is attached to the axle, as indicated by Fig. 8, so as to compensate for the movement of the body with respect to the axle.

Having thus described our invention, we claim:

1. The combination with a motor vehicle of a fender-frame, vertical rods secured thereto, brackets attached to the vehicle and having bearing-sleeves through which the aforesaid rods pass for slidably supporting the fender-frame, horizontal rods slidably supported on the vehicle and extending in proximity to the vertical rods, conical collars on the vertical and horizontal rods, respectively, and adapted to engage one with the other for supporting the fender-frame normally in elevated position, and means for operating the horizontal rods.

2. The combination with a motor vehicle of brackets attached thereto and each having vertical and horizontal bearing-sleeves, a fender-frame, vertical rods secured thereto and passing through the vertical bearing-sleeves of the brackets, spring-actuated horizontal rods slidably mounted in the horizontal bearing sleeves of the brackets and extending to and in front of the vertical rods of the fender-frame, a cross-bar connecting the forward ends of said rods, and conical collars on the aforementioned vertical and horizontal rods and adapted to engage one with the other to hold the fender-frame normally in elevated position, substantially as shown and for the purpose set forth.

3. The combination with a motor vehicle of brackets attached thereto, a fender-frame, vertical rods secured thereto and slidable in the brackets, horizontal rods slidably mounted on the vehicle and extending to and in front of the vertical rods, a cross-bar connecting the forward ends of the horizontal rods, and conical collars on the aforementioned vertical and horizontal rods adapted to engage with each other to support the fender-frame in elevated position, together with a bail connected to the horizontal rods, and an operating-lever connected to said bail, substantially as shown and for the purpose set forth.

4. The combination with a motor-vehicle of brackets attached thereto, a fender-frame, vertical rods secured thereto and slidable in the brackets, horizontal rods slidably mounted on the vehicle and extending to and in front of the vertical rods, a cross-bar connecting the forward ends of the horizontal rods, a conical collar on each vertical rod, and a companion conical collar on each horizontal rod engaging the other collar at the rear thereof, the horizontal rod being offset to one side in front of its collar to form a seat for the companion collar on the vertical rod, and springs for moving the horizontal rods forward, substantially as shown and for the purpose set forth.

5. The combination with a motor vehicle of a fender consisting of a wire frame having loops near its ends and horizontal rods extending between the loops and side bars of the fender-frame, netting covering the frame with the exception of the spaces within the loops, rods attached to the lower end of the fender-frame and extending upward between the members of the loops, and rollers at the lower end of said fender-frame; together with brackets on the vehicle in which the aforesaid vertical rods of the fender slide, horizontal rods slidably mounted on the vehicle and extending to and in front of the vertical rods of the fender, a cross-bar connecting the forward ends of the horizontal rods, said horizontal rods being offset to one side in the rear of the vertical rods, a conical collar on each horizontal rod in rear of the offset portion thereof, a conical collar on each vertical rod of the fender arranged to rest on the companion collar on the horizontal rod, and springs for moving the horizontal rods forward, substantially as shown and for the purpose set forth.

JOHN W. SAUNDERS.
OTTO K. FÖRSTER.

Witnesses:
CARL W. STEFFENS,
HENRY BECKER.

Copies of this patent may be obtained for five cents each, by addressing the "Commissioner of Patents, Washington, D. C."